United States Patent
Kimata et al.

(10) Patent No.: US 7,257,233 B2
(45) Date of Patent: Aug. 14, 2007

(54) IMAGE FORMING DEVICE AND IMAGE FORMING METHOD

(75) Inventors: Hirokatsu Kimata, Tokyo (JP); Katsutoshi Sakao, Kanagawa (JP); Yasunori Matsui, Kanagawa (JP)

(73) Assignee: Sony Corporation, Tokyo (JP)

(*) Notice: Subject to any disclaimer, the term of this patent is extended or adjusted under 35 U.S.C. 154(b) by 668 days.

(21) Appl. No.: 10/494,589

(22) PCT Filed: Sep. 5, 2003

(86) PCT No.: PCT/JP03/11370

§ 371 (c)(1),
(2), (4) Date: May 5, 2004

(87) PCT Pub. No.: WO2004/025950

PCT Pub. Date: Mar. 25, 2004

(65) Prior Publication Data

US 2005/0005292 A1  Jan. 6, 2005

(30) Foreign Application Priority Data

Sep. 10, 2002  (JP)  ............................. 2002-264671

(51) Int. Cl.
    *G06K 9/00* (2006.01)
(52) U.S. Cl. ........................ 382/100; 382/190
(58) Field of Classification Search .............. 382/100, 382/190, 173, 258, 266, 165, 176; 714/46, 714/47; 358/1.1, 1.5; 703/24; 725/35, 116; 386/46, 83; 348/170
See application file for complete search history.

(56) References Cited

U.S. PATENT DOCUMENTS

| 5,659,350 | A | * | 8/1997 | Hendricks et al. | ........... | 725/116 |
| 5,684,918 | A | * | 11/1997 | Abecassis | ..................... | 386/83 |
| 5,828,863 | A | * | 10/1998 | Barrett et al. | .................. | 703/24 |
| 5,828,864 | A | * | 10/1998 | Danknick et al. | ............. | 703/24 |
| 5,935,262 | A | * | 8/1999 | Barrett et al. | .................. | 714/46 |
| 6,313,921 | B1 | * | 11/2001 | Kadowaki | ................... | 358/1.15 |
| 6,463,585 | B1 | * | 10/2002 | Hendricks et al. | ............ | 725/35 |
| 6,504,990 | B1 | * | 1/2003 | Abecassis | ..................... | 386/46 |
| 6,553,178 | B2 | * | 4/2003 | Abecassis | ..................... | 386/83 |
| 6,714,723 | B2 | * | 3/2004 | Abecassis | ..................... | 386/83 |

FOREIGN PATENT DOCUMENTS

| JP | 2001-160933 | 6/2001 |
| JP | 2002-77755 | 3/2002 |
| JP | 2002-247491 | 8/2002 |

* cited by examiner

*Primary Examiner*—Anh Hong Do
(74) *Attorney, Agent, or Firm*—Frommer Lawrence & Haug LLP; William S. Frommer

(57) ABSTRACT

The present invention is intended to provide an image forming apparatus and an image forming method which are high in user-friendliness and entertainment and enhanced in convenience in viewing broadcast programs. Through a modem (40), program guide data are obtained from a server arranged on the Internet, the obtained program guide data are stored in an EPG memory, and viewing log data for a selected broadcast program are stored in a viewing log memory (35). On the basis of the viewing log data and the program attribute of the program guide data, the viewing period of time for each program attribute is summarized and, on the basis of the summarized data, each character image formed by the image data stored in a character data memory is altered in accordance with user's liking in viewing broadcast programs.

12 Claims, 10 Drawing Sheets

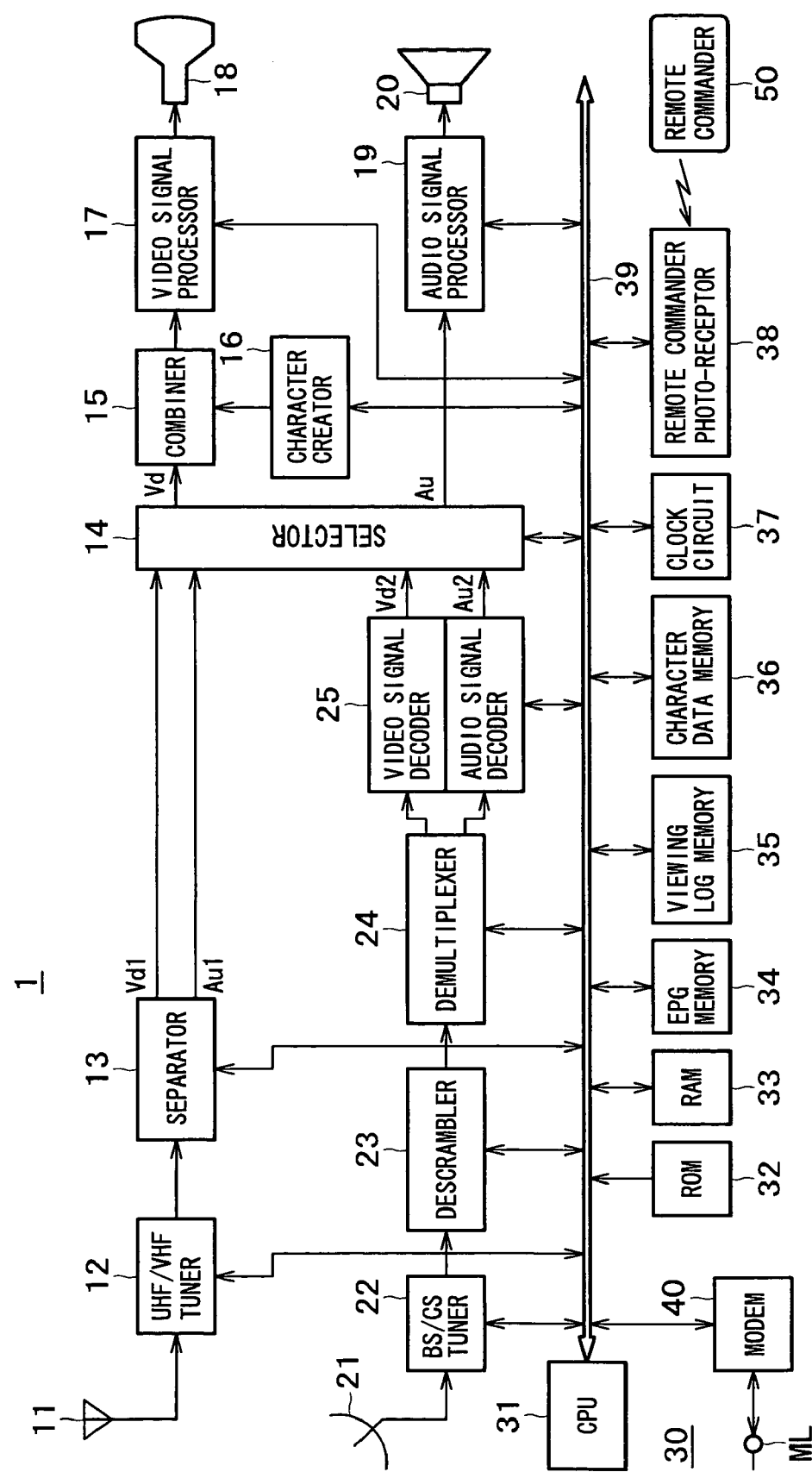

FIG. 4

| BROADCAST STATION | BROADCAST DATE | BROADCAST TIME | PROGRAM NAME | DETAILS OF CONTENTS | PERFORMER | ATTRIBUTE |
|---|---|---|---|---|---|---|
| ○○ TV | '02.09.01 | 6:00~7:00 | GOOD MORNING | INFORMATION IN THE MORNING | ○○ AND OTHERS | INFORMATION |
| | '02.09.01 | 7:00~7:30 | NEWS | NEWS WEATHER FORECAST | ××× | NEWS |
| ......... | ......... | ......... | ......... | ......... | ......... | ......... |

FIG. 5

ATTRIBUTE = PROGRAM GENRE

| 01 SPORTS | | | | 02 VARIETY | | | | |
|---|---|---|---|---|---|---|---|---|
| 01 BASE-BALL | 02 SUCCOR | 03 GOLF | ...... | 01 TALK | 02 QUIZ | 03 INFOR-MATION | 04 COOKING | 05 TRAVEL | ...... |

| 03 DRAMA | | | | 04 NEWS | | 05 MOVIE | | |
|---|---|---|---|---|---|---|---|---|
| 01 SAMURAI | 02 HOME | 03 OVERSEAS | ...... | 00 NEWS | | 01 DOMESTIC | 02 OVERSEAS | ...... |

| 06 EDUCATION | | | |
|---|---|---|---|
| 01 LANGUAGE | 02 CHILDREN | 03 CULTURE | ...... |

FIG. 6

| DATE \ GENRE (ATTRIBUTE) | BASEBALL | COOKING | QUIZ | NEWS | ... |
|---|---|---|---|---|---|
| 9/1 | 2.5 (h) | | | | ... |
| 9/2 | 2 (h) | 2 (h) | | | ... |
| 9/3 | | | 2 (h) | 0.5 (h) | ... |
| ... | ... | ... | ... | ... | ... |

FIG. 7
| BASIC CHARACTER | 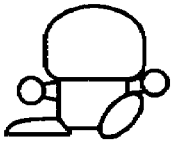 |
| --- | --- |
| BASEBALL FAN PARTS |  |
| SUCCOR FAN PARTS |  |
| HOME CHEF PARTS |  |
| STUDIOUS BOY PARTS |  |
| ⋮ | ⋮ |

9/1 BASEBALL LIVE HAS BEEN VIEWED FOR 2 AND HALF HOURS
⇩
BASEBALL IS VIEWED MOST
⇩
(A)    (B)

9/2 VIEWING GENRE FOUND?
⇩
VIEWING OF BASEBALL LIVE AND COOKING PROGRAMS INCREASED OVER REFERENCE PERIOD OF TIME
⇩
(B)    (C)    (D)

9/3 VIEWING GENRE FOUND?
⇩
VIEWING OF QUIZ PROGRAMS INCREASED OVER REFERENCE PERIOD OF TIME
⇩
(D)    (E)

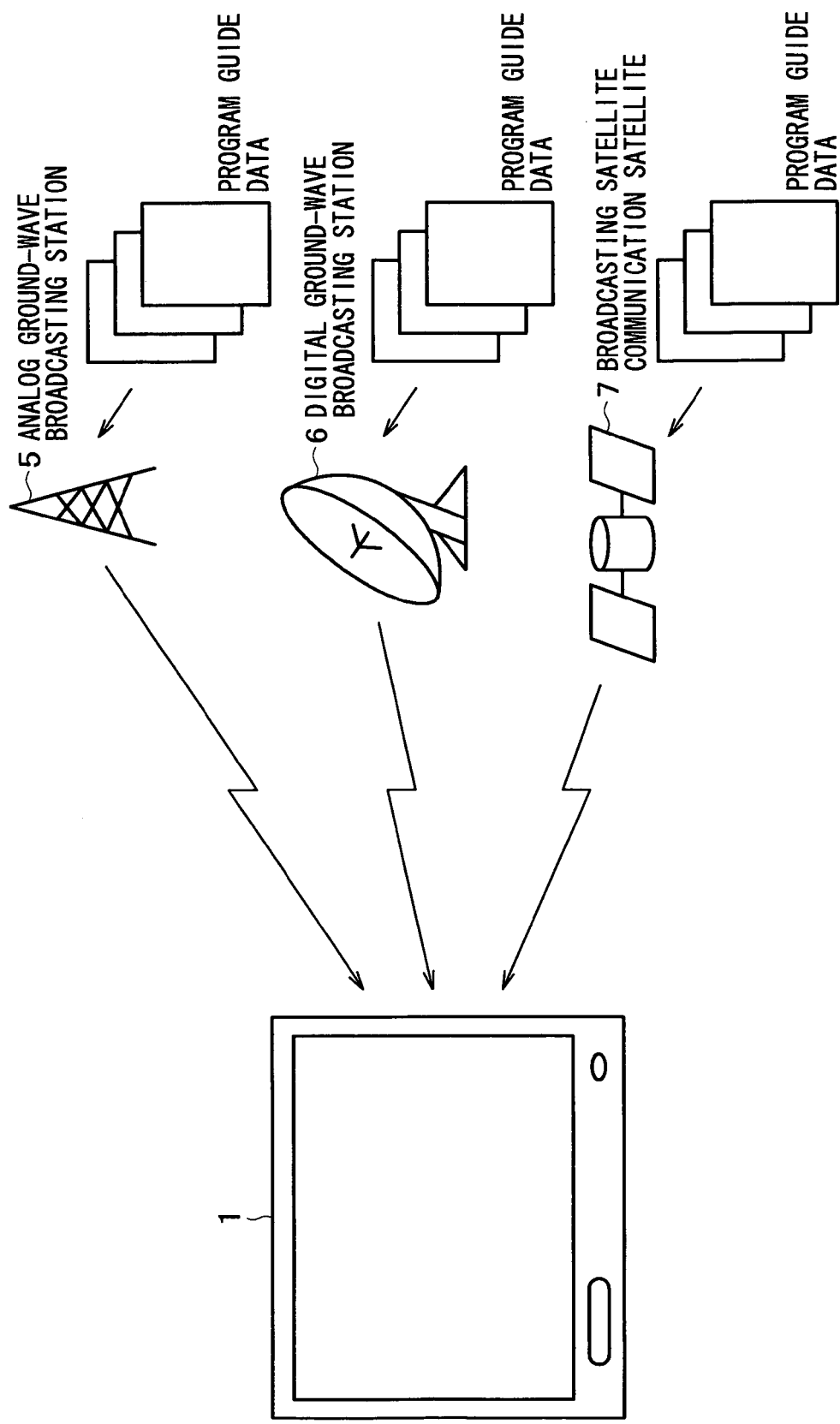

IMAGE FORMING DEVICE AND IMAGE FORMING METHOD

TECHNICAL FIELD

The present invention relates to an image forming apparatus and an image forming method which are intended to create character images from prepared image data and displaying the formed character images, for example.

BACKGROUND ART

For example, in analog ground-wave television broadcasting, character information and still-picture information are superimposed on the VBI (Vertical Blanking Interval) of a television broadcast signal to practice so-called teletext broadcasting for providing various kinds of character information and still-picture information in addition to video and audio data of broadcast programs.

In the digital satellite broadcasting based on BS (Broadcasting Satellite) and CS (Communication Satellite), EPG (Electronic Program Guide) data and various control data are provided in a superimposed manner in addition to video and audio data which constitute broadcast programs.

With television receiving sets and receivers having capacities of receiving analog ground-wave television broadcast and digital satellite broadcast, character broadcast information can be extracted from a received broadcast signal for display and EPG data can be extracted to form an EPG which is displayed for use in program selection.

Also, with television receiving sets and receivers for receiving broadcast signals, a guidance is displayed at the time of changing or adjusting various settings by displaying the channel number of a broadcast channel tuned in from another broadcast channel and displaying a volume level in a volume level bar at the time of volume adjustment, current time display is executed on the basis of the built-in clock circuit.

Meanwhile, television receiving sets and receivers having capabilities of receiving broadcast signals adapted to enhance ease of operation and convenience by providing users with various kinds of information conveyed by broadcast signals and executing various kinds of guidance displays as described above are high in home use and therefore play a central role among various audio visual equipment units.

Consequently, it is expected for the television receiving sets and receivers not only to realize the capabilities of providing users with the information provided from the outside and the capabilities of displaying guidance for example to enhance ease of operation and convenience in viewing but also to enhance user friendliness and entertainment.

It is therefore an object of the present invention to provide an image forming apparatus and an image forming method for realizing the enhancement in user-friendliness, entertainment, and convenience in viewing broadcast programs.

DISCLOSURE OF INVENTION

In carrying out the invention and according to one aspect thereof, there is provided an image forming apparatus of invention (1) including: obtaining means for obtaining program guide data including at least attribute information of each broadcast program; use log forming means for forming, by identifying each broadcast program adapted to be viewed, use log information for the identified each broadcast program; character image forming means for forming a character image to be displayed by use of image data for forming a character image; viewing log summary table forming means for forming a viewing log summary table obtained by relating the use log information formed at least by the use log forming means to the attribute information included in the program guide data obtained by the obtaining means; and character image altering means for altering the character image formed in advance, on the basis of the viewing log summary table.

According to the above-mentioned image forming apparatus of invention (1), the program guide data are obtained by the obtaining means, a broadcast program adapted to be viewed is identified by the use log forming means, and the use log information for each identified broadcast program is formed. Next, the image data for forming character images are used by the character image forming means to form character images.

Then, the character image altering means alters the character image formed before by the viewing log summary table for creating the viewing log summary table relating use log information with the attribute information of broadcast program and on the basis of this viewing log summary table. The character image thus created is displayed alone or together with the video of each selected broadcast program, for example.

Consequently, rather than displaying only the video of each broadcast program provided by a broadcast signal, character images are formed on the side of the image forming apparatus on its own to display both video and character images. The present invention realizes an image forming apparatus which has a broadcast signal receiving capability and is high in user-friendliness and entertainment and enhanced in convenience in viewing broadcast programs by informing the user of his linking in viewing for broadcast programs.

An image forming apparatus of invention (2) is the image forming apparatus according to invention (1), wherein the obtaining means connects a communication line with a server arranged on a communication network and obtains the program guide data from the server.

According to the image forming apparatus of invention (2), program guide data are obtained from a server arranged on a communication network such as the Internet for example. This configuration allows to get the program guide data about broadcast programs provided in various broadcasting modes with reliability and ease without being depending on the broadcasting modes.

An image forming apparatus of invention (3) is the image forming apparatus according to invention (1), wherein the obtaining means obtains the program guide data which are superimposed on a received broadcast signal.

According to the image forming apparatus of invention (3), program guide data are provided as superimposed on a free area of vertical blanking line (VBL) in the case of analog ground-wave television broadcasting or packetized in the case of digital satellite broadcasting for example to be multiplexed with the video data and audio data of each broadcast program before being provided.

The program guide data thus provided are obtained by the obtaining means of the broadcast signal receiving side. Consequently, the program guide data can be obtained from the received broadcast signal for using the obtained program guide data.

An image forming apparatus of invention (4) is the image forming apparatus of invention (1), wherein the viewing log summary table is updated in a predetermined time interval and the character image altering means alters the character image formed in advance, in accordance with the update of the viewing log summary table.

An image forming apparatus of invention (5) is the image forming apparatus of invention (1), further including: image data obtaining means for obtaining image data from a server holding image data for forming various character images arranged on a communication network by connecting a communication line with the server.

According to the image forming apparatus of invention (5), the image data for forming character images can be obtained from a server arranged on a communication network through the image data obtaining means.

Consequently, because the image data for forming new character images can be obtained from a server on a communication network, the user can use new character images, thereby preventing banality from occurring from the continuous use of same, old character images.

An image forming apparatus of invention (6) is the image forming apparatus of invention (1), wherein the broadcast signal is multiplexed with image data for forming a character image as required; the image forming apparatus further including: image data extracting means for extracting the image data from the broadcast signal to make the extracted image data usable.

According to the image forming apparatus of invention (6), the image data for forming character images are provided as superimposed on a free area of vertical blanking line (VBL) in the case of analog ground-wave television broadcasting or packetized in the case of digital satellite broadcasting for example to be multiplexed with the video data and audio data of each broadcast program before being provided.

The image data thus provided are extracted through the image data extracting means of the broadcast signal selectively receiving side. Consequently, the image data for forming character images are extracted from each received broadcast signal and the extracted image data are used.

BRIEF DESCRIPTION OF DRAWINGS

FIG. 3 is a block diagram illustrating an exemplary configuration of the television receiving set 1 shown in FIG. 1.

FIG. 4 illustrates an exemplary format of program guide data which are downloaded by the television receiving set 1 shown in FIG. 1.

FIG. 5 illustrates program attributes of the program guide data shown in FIG. 4.

FIG. 6 illustrates a viewing log summary table which is formed in the television receiving set 1 shown in FIG. 3.

FIG. 7 illustrates image data which are stored in a character data memory of the television receiving set 1 shown in FIG. 3.

FIG. 10 is a schematic diagram illustrating another example of routes through which necessary data such as program guide data are obtained.

BEST MODE FOR CARRYING OUT THE INVENTION

The following describes an image forming apparatus and an image forming method practiced as one embodiment of the invention with reference to the accompanying drawings. In the following embodiments, the image forming apparatus and the image forming method according to the invention are applied to a television receiving set.

[Main Functions of Television Receiving Set 1]

Figure 1:
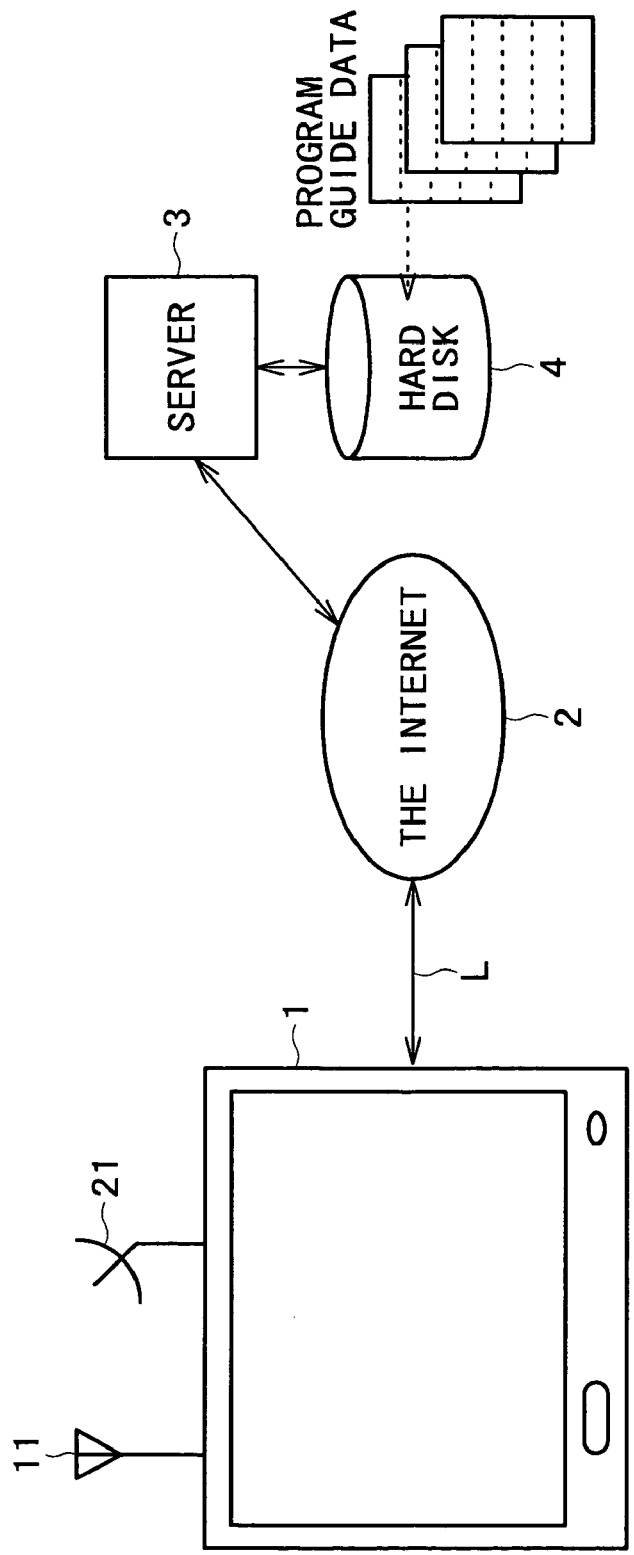
FIG. 1 is a schematic diagram illustrating a television receiving set 1 practiced as one embodiment of an image forming apparatus and an image forming method according to the present invention.

Now, referring to FIG. 1, there is shown a diagram for describing the main functions of a television receiving set practiced as one embodiment of the invention. As shown in FIG. 1, a television receiving set 1 of this embodiment is connected to an antenna 11 installed outdoors for example for receiving analog ground-wave television broadcast signals and a parabola antenna 21 for receiving digital satellite broadcast signals, thus being capable of using both analog ground-wave television broadcasting and digital satellite broadcasting.

It should be noted that, in analog ground-wave television broadcasting, the video and audio signals of a plurality of broadcast programs cannot be simultaneously transmitted through only one broadcasting channel (transmission path), so that the video and audio signals of one broadcast program are always transmitted at a time. Therefore, only selecting a broadcasting channel allows the viewing of a desired broadcast program.

On the contrary, in digital satellite broadcasting, the video and audio data of a plurality of broadcast programs are encoded for data compression, the compressed data are packetized, the packets are multiplexed for transmission through one broadcasting channel (transmission path). Therefore, rather than only selecting a broadcasting channel, broadcasting channel selection and the selection of a desired broadcast program from among a plurality of broadcast programs received through the selected channel must be performed at the same time for the viewing of the desired broadcast program.

The television receiving set 1 of the present embodiment has a modem through which it is connected to the Internet 2 to send and receive electronic mail and access various servers arranged on the Internet 2 for browsing desired Web pages and downloading desired data via telephone line L. Namely, the television receiving set 1 has Internet connection capabilities.

By use of its Internet connection capabilities, the television receiving set 1 accesses a predetermined server 3 which provides program guide data in a predetermined timed relation to download program guide data stored in a hard disk 4 of the server 3, capture the downloaded program guide data, and use them.

The program guide data have contents which are generally similar to electronic program guide data (EPG data) adapted to be provided by digital satellite broadcasting; for example, the program guide data have information such as broadcasting station, broadcasting date, broadcasting time, program name, detail contents of program, performer, attribute (program genre) for example, which will be detailed.

In the television receiving set 1 in which the program guide data as described above have been captured, a program guide is formed from the captured program guide data and the formed program guide is presented on its display for the user to check desired broadcast programs and select a desired broadcast program from the displayed electronic program guide.

In the present embodiment, the hard disk 4 of the server 3 stores the program guide data of television broadcast programs provided by analog ground-wave television broadcasting and the program guide data of broadcast programs provided by digital satellite broadcasting. The server 3 can provide both the program guide data to the television receiving set 1 to which it is connected.

It should be noted that the television receiving set 1 of the present embodiment can capture the electronic program guide provided as multiplexed with digital satellite broadcast and use the captured data. However, the television receiving set 1 can also get the program guide data about broadcast programs provided by digital satellite broadcasting and use these program guide data.

In order for the mixture of the electronic program guide data provided by digital satellite broadcasting and the program guide data supplied from servers not to cause troubles, the television receiving set 1 of the present embodiment is adapted to allow the user to set beforehand the use of either the electronic program guide data provided by digital satellite broadcasting or the program guide data supplied from servers, for example.

Obviously, both the electronic program guide data provided by digital satellite broadcasting and the program guide data supplied from servers may be used at the same time, thereby allowing the user to get program guide data from either source. In this case, if there are program guide data for a predetermined interval of time in the television receiving set 1 for example, it does not extract or download program guide data extraction; if most recent program guide data have been provided, the television receiving set 1 executes control for getting them.

Next, the television receiving set 1 of the present embodiment gets, from the program guide data, program attributes of each broadcast program that has been actually selected for viewing, forms a viewing log information so that broadcast programs of which program attribute have been viewed for how long can be understood, and stores the formed viewing log information, thereby allowing the understanding of the viewing of broadcast programs of which attribute for how long.

Further, an important feature of the television receiving set 1 of the present embodiment is the capabilities of forming and displaying so-called character images based on peoples, animals, plants, and so on and altering the formed character images on the basis of the likings of the user of the television receiving set 1 to broadcast programs which can be understood from the viewing log information.

Figure 2A:
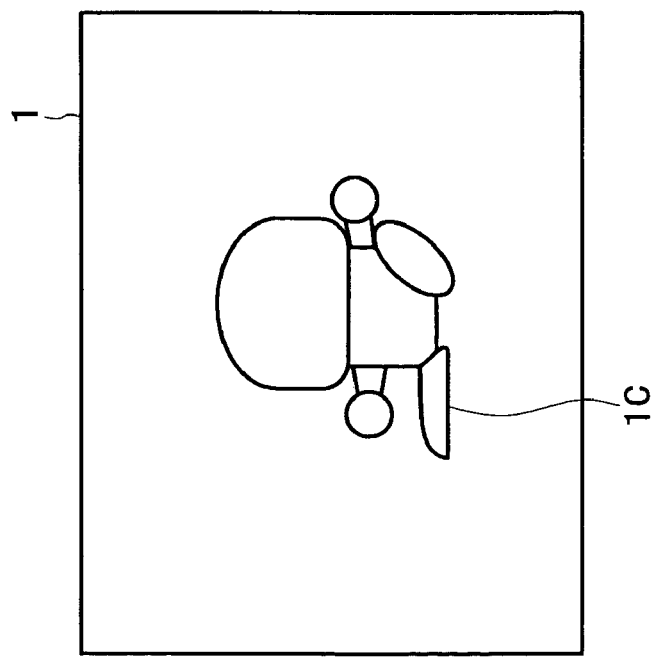
FIGS. 2A and 2B illustrate the forming and displaying of a character image which are executed on the television receiving set 1 shown in FIG. 1.
Figure 2B:
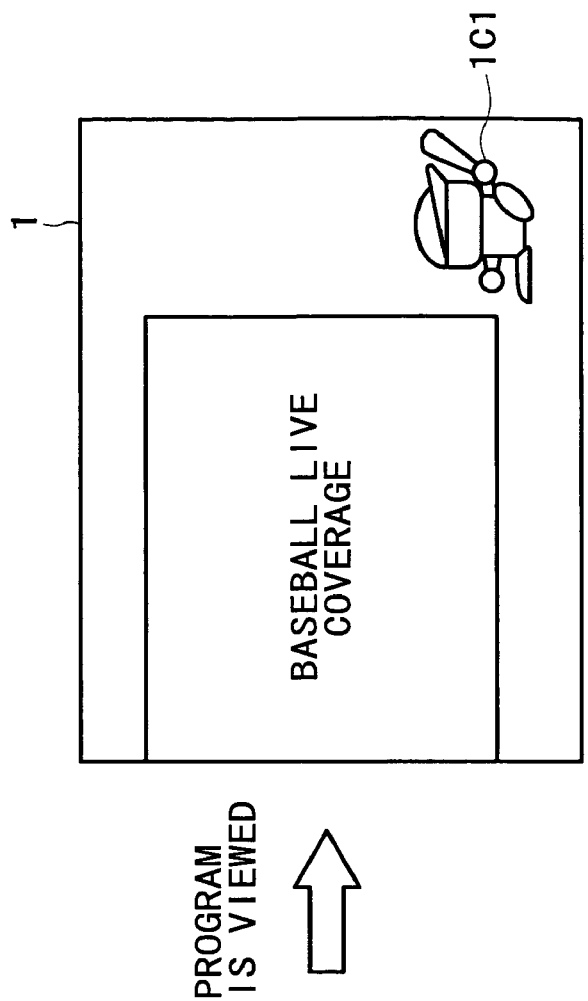

Referring to FIGS. 2A and 2B, there are illustrated the functions of displaying a character image and altering this character image. The television receiving set 1 of the present embodiment has the image data from which to form character images. When no viewing log has been accumulated yet just after the purchase of the television receiving set 1 for example, the image data for forming basic character images are used to form basic character image 1C and the formed image is displayed as shown in FIG. 2A for example.

Subsequently, when a broadcast program is viewed through the television receiving set 1 and, if the viewed broadcast program is a baseball live coverage for example and this broadcast program has been viewed for more than a predetermined period of time, then, on the basis of the viewing log information in this case, basic character image 1C is altered, by use of part image data for transforming the basic character image, to a character image 1C1 with a baseball cap and a bat as shown in FIG. 2B.

Namely, in this example, on the basis of the viewing log information that a broadcast program of which attribute is baseball has been viewed for more than a predetermined period of time, the character image is altered to a baseball fan character image and this altered image is displayed.

As described above, the television receiving set 1 of the present embodiment can uniquely form character images by itself and, by obtaining the liking in viewing for broadcast programs of the user of the television receiving set 1 from the viewing log information, alter the character image in accordance with that liking in viewing, displaying the altered character image.

Consequently, separately from the images of broadcast programs provided by broadcasting, the television receiving set 1 can uniquely form and display character images which can be altered, thereby resulting in a television receiving set which is enhanced in user-friendliness and entertainment as well as convenience in viewing that user's liking in viewing for broadcast programs can be understood by means of character images.

It should be noted that, in the character image display examples shown in FIGS. 2A and 2B, FIG. 2A shows an example in which the television receiving set 1 is put in a mode for making confirmation of a character image for example, thereby showing the case in which character image 1C is displayed all over the display screen of the display unit of the television receiving set 1.

Also, in the character image display examples shown in FIGS. 2A and 2B, FIG. 2B shows an example of an image at the time of viewing a normal broadcast program in which the screen is divided into a broadcast program image display area and a character image display area. The displaying of the character images shown in FIGS. 2A and 2B are illustrative only; therefore, character images may be displayed in various other manners.

Character images may be displayed as still images or moving images which moves in various manners. In addition, in accordance with user instructions, the displaying of character images can be turned on/off; when the displaying is turned off with a character image being as shown in FIG. 2B, the broadcast program image is displayed all over the screen of the display unit.

[Exemplary Configuration of the Television Receiving Set 1]

The following describes an exemplary configuration of the television receiving set 1 of the present embodiment. Referring to FIG. 3, there is shown in block diagram illustrating an exemplary configuration of the television receiving set 1 of the present embodiment.

As shown in FIG. 3, the television receiving set 1 of the present embodiment includes a UHF/VHF tuner 12 connected to the antenna 11 and an audio/video separator 13 (a separator in FIG. 3) and has an analog signal processing line for processing analog ground-wave television signals and a digital signal processing line for processing digital satellite broadcast signals which is composed of a BS/CS tuner 22 connected to the parabola antenna 21, descrambler 23, a demultiplexer 24, and an audio/video decoder 25.

Arranged after these analog signal processing line and digital signal processing line are a selector 14 for selecting a signal from among those supplied from these lines to be outputted, a video combiner (a combiner in FIG. 3) 15, a character creator 16, a video signal processor 17, a display 18, an audio signal processor 19, and a speaker 20.

The television receiving set 1 has a controller 30 having a microcomputer configuration based on a CPU (Central Processing Unit) 31, a ROM (Read Only Memory) 32, and a RAM (Random Access Memory) 33 are interconnected through a CPU bus 39 as shown in FIG. 3. The controller 30 controls the component circuits of the television receiving set 1.

The ROM 32 stores various processing programs to be executed in the television receiving set 1 and the data necessary for the processing. The RAM 33 is used for a so-called work area in which intermediate results of each processing are temporarily stored for example.

The CPU bus 39 is connected to an EPG memory 34 for storing program guide data, a viewing log memory 35 for storing viewing log data, and a character data memory 36 for storing image data for forming character images. Each of these memories, the EPG memory 34, the viewing log memory 35, and the character data memory 36, is a so-called non-volatile memory which retains data stored therein after the power is turned off.

The CPU bus 39 is also connected to a clock circuit 37, a remote commander signal photo receptor 38, and a modem 40. The clock circuit 37 supplies current date, current day of week, and current time information and has a counter capability of counting time. The remote commander signal photo receptor 38 receives infrared remote commander signals issued in accordance with user input operations from a remote commander 50 which is a remote control device, and supplies the received signals into electrical signals, supplying them to the CPU 31.

The modem (modulator/demodulator) 40 provides connection between the television receiving set 1 and a communication network, thereby allowing data transfer between the television receiving set 1 and servers for example on a communication network.

In the present embodiment, the modem 40 is connected to a telephone line ended with a modular jack ML which is drawn from a telephone network L as shown in FIG. 3. Consequently, as described with reference to FIG. 1, the television receiving set 1 can perform the transfer of electronic mail and the browsing of Web pages via the telephone network L and the Internet 2.

[Program Guide Data (EPG Data) and their Acquisition]

As described with reference to FIG. 1, the television receiving set 1 of the present embodiment accesses the server 3 on the Internet 2 once a day for example at a predetermined time or when the user issues a command to access, downloads the most recent program guide data, and records the downloaded program guide data to the EPG memory 34 through the controller 30.

FIG. 4 illustrates an exemplary format of the program guide data which are downloaded from the predetermined server 3 and recorded to the EPG memory 34. As shown in FIG. 4, the program guide data to be provided by the server 3 in the present embodiment are configured by the information indicative of broadcasting station, broadcasting date, broadcasting time, program name, details of program contents, performers, and program attributes for example for each broadcast program.

The above-mentioned broadcasting station is indicative of the information such as an identifier or an identification name for identifying a broadcasting station which broadcast that broadcast program, thereby identifying a transmission channel (a broadcasting channel) for providing that broadcast program. The broadcasting date is indicative of a date on which that broadcast program is broadcast, in a total of six digits, namely, two digits of Christian year, two digits of month, and two digits of day. The broadcasting time is indicative of the start time and end time of that broadcast program in units of minutes or seconds of 24-hour system. It should be noted that the indication of the broadcasting date is not restricted to that mentioned above; for example, month may be represented in "09", "SEP", or others.

The program name is indicative of the title of that broadcast program and has an identifier for identifying that broadcast program. The details of contents is indicative of the information in which the contents of that broadcast program are represented in letters (text). The performer is indicative of the main performer or performers of that broadcast program. The program attribute located at the right end of the format shown in FIG. 4 is indicative of the information representing the genre of that broadcast program which is given in accordance with a predetermined genre classification.

FIG. 5 illustrates predetermined program attributes, indicating parts of various program attributes. As shown in FIG. 5, the program attributes allow the understanding of not only major classifications of sport, variety, and drama, but also minor classifications.

The program attributes used in the present embodiment allow, if that program belongs to sports category, the understanding of a particular sport, baseball, succor, or golf, and if that program belongs to variety category, the understanding of a particular variety, talk, quiz, information, cooking, or travel as shown in FIG. 5 for example. Namely, both the major classification and the minor classification are used to identify the attributes of each broadcast program to allow the user to understand the type of each broadcast program.

The program guide data having the format shown in FIG. 4 including the program attributes which can be classified by both the above-mentioned major and minor classifications shown in FIG. 5 are obtained from the predetermined server 3 through the Internet 2, the telephone line L, and the modem 40 to be stored in the EPG memory 34 through the controller 30.

Next, as described above, the television receiving set 1 of the present embodiment gets program guide data in a predetermined timed relation, forms the display data for forming and displaying a program guide from the obtained program guide data, and supplies the display data to the video signal processor 17 to form a display signal, thereby displaying the program guide onto the display screen of the display 18.

The program guide shown on the display screen of the display 18 allows the user to understand the broadcasting channel, broadcasting time, details of contents, and performer of a desired broadcast program and, by selecting a desired broadcast program, view that broadcast program.

[Viewing Log Data and their Storage]

When the power to the television receiving set 1 of the present embodiment is turned on and a broadcast program provided by analog ground-wave television broadcasting is viewed or a broadcast program provided by digital satellite broadcasting is viewed, view log information is formed and the formed view log information is stored and held in the viewing log memory 35.

The following describes the processing to be executed in the television receiving set 1 from turning on the power to the television receiving set 1 to forming and storing viewing log information to reproduce a broadcast program for viewing.

It should be noted that, for the brevity of description, it is assumed that the television receiving set 1 of the present embodiment store the information for identifying a broadcasting channel selected immediately before the power is turned off and, when the power is turned on again, automatically select the broadcasting channel selected immediately before the power was last turned off; namely, it is assumed that the television receiving set 1 have a so-called last channel memory capability.

When the television receiving set 1 is powered on, the controller 30 reads the last channel data from a non-volatile memory such as an EEPROM, not shown, in which the last channel data are stored. Next, if the read last channel data are indicative that an analog ground-wave television broadcast was selected, the controller 30 switches the selector 14 so that the video/audio signals from the audio/video separator 13 are outputted.

On the basis of the read last channel data, the controller 30 forms a station select control signal for selecting a desired analog ground-wave broadcast signal and supplies the formed signal to the UHF/VHF tuner 12.

At this moment, the controller 30 forms the information indicative of the broadcasting channel (the broadcasting station) selected by the UHF/VHF tuner 12, the information for identifying the broadcast program being broadcast by that broadcasting channel, this broadcast program being extracted from the program guide data, and the viewing log information composed of the program attribute and broadcasting date of that broadcast program and the use start time obtained from the clock circuit 37 and stores and holds the these pieces of information in the viewing log memory 35.

Subsequently, while the power is on, the controller 30 identifies from the program guide data the broadcast program currently provided by the broadcast signal selected by the UHF/VHF tuner 12 at the current time indicated by the clock circuit 37 and determines whether the viewed broadcast program has ended.

If the viewed program is found ended in this decision process, then the time at that moment is obtained from the 37, the use end time of the corresponding viewing log data held in the viewing log memory 35 is updated, the viewing log data having the above-mentioned information about a broadcast program which is newly started are formed, and the formed viewing log data are stored and held in the viewing log memory 35.

The updating of the use end time of the viewing log data and the creation and storage of the viewing log data about a new broadcast program into the viewing log memory 35 are also executed when the selection is changed, via the program guide shown on the display 18 for example. The change of selection includes both cases in which the channels in analog ground-wave television broadcasting are switched between and analog ground-wave television broadcasting is switched to digital satellite broadcasting. When the power to the television receiving set 1 is turned off, the use end time of the viewing log data is also updated.

Next, on the basis of the selection control signal supplied from the controller 30, the UHF/VHF tuner 12 selectively receives a desired broadcast signal, demodulates the selected broadcast signal, and supplies the resultant signal to the separator 13 on the following stage. The separator 13 separates the supplied broadcast signal into video signal Vd1 and audio signal Au1 and supplies them to the selector 14.

As described above, because the selector 14 is switched by the controller 30 so that the video signal Vd1 and audio signal Au1 supplied from the separator 13 are outputted, the selector 14 supplies video signal Vd1 supplied from the separator 13 to the video combiner 15 as video signal Vd subject to output.

The video combiner 15 combines a character image created by the character creator 16 with video signal Vd supplied from the selector 14 and supplies the video signal combined with the character image to the video signal processor 17, which will be detailed later.

From the supplied video signal, the video signal processor 17 forms a video signal of detection to be supplied to the display 18. An image of the broadcast program provided by the selected broadcast signal is displayed on the display screen of the display 18.

On the other hand, the audio signal supplied from the separator 13 is supplied to the audio signal processor 19 in which the audio signal is amplified and adjusted in tone quality under the control of the controller 30, the resultant audio signal being supplied to the speaker 20. Consequently, the sound of the broadcast program selected and provided by the broadcast signal is outputted from the speaker 20.

If the last channel data read by the controller 30 upon powering on of the television receiving set 1 are indicative of the use of digital satellite broadcasting, then the controller 30 switches the selector 14 so that the video and audio signals supplied from the audio/video decoder 25 are outputted.

Next, in the case of digital satellite broadcasting, the video data and audio data of a plurality of broadcast programs are transmitted in a multiplexed manner on one broadcasting channel as described above, so that the controller 30 forms a station select control signal for selecting the broadcast signal transmitted by a desired broadcasting station in accordance with the information stored in the last channel memory and supplies the formed station select control signal to the BS/CS tuner 22. At the same time, in accordance with the identifier for identifying the broadcast program of the last channel data, the controller 30 forms a selection control signal for selecting a predetermined broadcast program from among the broadcast programs currently broadcast on the selected broadcasting channel and supplies the formed selection control signal to the demultiplexer 24.

At this moment, the controller 30 forms the information indicative of the broadcasting channel (the broadcasting station) selected by the BS/CS tuner 22, the information for identifying a broadcast program selected by the demultiplexer 24, and the viewing log information composed of the program attribute and broadcasting date of that broadcast program and the use start time obtained from the clock circuit 37 and stores and holds the these pieces of information in the viewing log memory 35.

Subsequently, while the power is on, the controller 30 identifies from the program guide data the broadcast program currently provided by the broadcast signal selected by the BS/CS tuner 22 at the current time indicated by the clock circuit 37 and selected and extracted by the demultiplexer 24 and determines whether the viewed broadcast program has ended.

If the viewed program is found ended in this decision process, then the time at that moment is obtained from the 37, the use end time of the corresponding viewing log data held in the viewing log memory 35 is updated, and the viewing log data having the above-mentioned information about a broadcast program which is newly selected are formed to stored and held in the viewing log memory 35.

The updating of the use end time of the viewing log data and the creation and storage of the viewing log data about a new broadcast program into the viewing log memory 35 are also executed when the selection is changed, via the program guide shown on the display 18 for example. The change of selection includes both cases in which the channels in analog ground-wave television broadcasting are switched between and analog ground-wave television broadcasting is switched to digital satellite broadcasting. When the power to the television receiving set 1 is turned off, the use end time of the viewing log data is also updated.

Next, on the basis of the station select control signal supplied from the controller 30, the BS/CS tuner 22 selectively receives a desired broadcast signal, demodulates the selected signal, and supplies the resultant signal to the descrambler 23 on the following stage. The descrambler 23 descrambles the supplied digital broadcast signal and supplies the descrambled digital broadcast signal to the demultiplexer 24.

The demultiplexer 24 extracts the video data and audio data of the broadcast program selected from among a plurality of broadcast programs multiplexed with the supplied digital broadcast signal. The video data of the extracted video and audio data are supplied to the video decoder of the audio/video decoder 25 and the audio data re supplied to the audio decoder of the audio/video decoder 25.

The video decoder of the audio/video decoder 25 decodes the supplied video data to restore the original video data as they were before decoding and D/A-converts the decoded video data into analog video signal Vd2. This analog video signal Vd2 is supplied to the selector 14, from which it is supplied to the video combiner 15 as video signal Vd to be outputted. Subsequently, the video signal Vd is processed in the same manner as with analog ground-wave television broadcast signals, thereby displaying the video of the desired broadcast program onto the display screen of the display 18.

On the other hand, the audio decoder of the audio/video decoder 25 decodes the supplied audio data to restore the original audio data as they were before decoding and D/A-converts the decoded audio data into analog audio signal Au2. This analog audio signal Au2 is supplied to the selector 14, from which it is supplied to the audio signal processor 19 as audio signal Au to be outputted. Subsequently, the audio signal Au is processed in the same manner as with analog ground-wave television broadcast signals, the audio of the desired broadcast program being sounded from the speaker 20.

Thus, when the power of the television receiving set 1 of the present embodiment is turned on and one of analog ground-wave television broadcasting or digital satellite broadcasting is selectively received, the television receiving set 1 of the present embodiment can correctly understand in detail (1) which broadcasting channel has been selected, (2) when a selected broadcast program has been broadcast, (3) which broadcast program has been viewed, (4) how long a selected broadcast program has been viewed, (5) what is the attribute of the viewed broadcast program, and other information on the basis of the viewing log information stored and held in the viewing log memory 35, as described above.

In the television receiving set of the present embodiment, character images can be uniquely formed and displayed on the television receiving set 1 on its own and the created images can be altered to the liking in viewing of the user of the television receiving set 1, as described above.

Hence, to controller 30 of the television receiving set 1 summarizes the viewing log information stored in the viewing log memory 35 to form a viewing log summary table as shown in FIG. 6. The viewing log summary table shown in FIG. 6 lists the viewing times of viewed broadcast programs by date and by program attribute.

This viewing log summary table allows the understanding of which program attributes (genres) of broadcast programs have been viewed for how long, namely, the user's liking in viewing for each of viewed broadcast programs.

It should be noted that, in the present embodiment, the viewing log summary table shown in FIG. 6 is summarized and updated at predetermined time intervals while the television receiving set 1 is powered on, for example, every 10 minutes, every 30 minutes, every hour, every two hours, and so on.

Obviously, besides the above-mentioned method of summarization in which broadcast programs are viewable with the television receiving set 1 powered on, it is also practicable to make summarization and update several times a day, every two hours, every four hours, or every six hours for example.

The viewing log summary table is formed in a storage area separate from the storage area in which the viewing log data in the viewing log memory 35 are stored, for example. Obviously, the viewing log summary table may be formed in a memory other than the viewing log memory.

[Forming of Character Images]

The following describes the forming of character images which uniquely created and displayed on the television receiving set 1 of the present embodiment on its own as described above. In the television receiving set 1 of the present embodiment, the image data (character data) for forming character images are stored in the character data memory 36.

FIG. 7 illustrates the image data stored in the character data memory 36. As shown in FIG. 7, the character data memory stores, in the form of a table, the basic character image data for forming basic character images and the part image data for forming part images for altering basic character images.

Index codes are assigned to the basic character image data and each of the part image data. Separately holding the index codes of image data in use allows the correct understanding of which image data are used for forming a particular character image and the quick reading of necessary image data for use.

In FIG. 7, the character image shown in the column of basic character is the basic character image which is used in the television receiving set 1 of the present embodiment and the basic character image data for forming this basic character image are stored in the character data memory 36.

In FIG. 7, there is only one basic character image. However, it is practicable to store a plurality of pieces of basic character image data to let the user choose any one of basic character images. In the present embodiment, decimal 2-digit index codes, 00 through 99 for example, are assigned to the basic character image data.

Further, the character table also stores the part image data which are used to create a variety of part images for altering the basic character image in accordance with the liking in viewing of the user of the television receiving set 1 for broadcast programs.

In the example shown in FIG. 7, the character table stores the part data for creating part images for altering the basic character image to a baseball fan character, the part image data for creating part images for altering the basic character image to a succor fan character, the part image data for creating part images for altering the basic character image to a home chef character, and the part image data for creating part images for altering the basic character image to a studious boy character.

To be more specific, as shown in FIG. 7, the character data memory 36 stores the part image data for creating a baseball cap, a bat, and a glove as part images for altering the basic character image to a baseball fun character, and the part image data for creating a succor ball and a uniform as part images for altering the basic character image to a succor fan character.

Also, the character data memory 36 stores the part image data for creating a cook's hat, a pan, and a dipper as part images for altering the basic character image to a home chef character and the part image data for creating glasses, a book, and a scholar's cap as part images for altering the basic image character to a studious body character.

Index codes are also assigned to these part image data and the index data to be assigned to each piece of the part image data are composed of the information corresponding to program attribute information and a sequential number, for example.

For example, index code "010101" is assigned to the part image data for creating a baseball cap for altering the basic character image to a baseball fun character and index code "010102" is assigned to the part image data for creating a bat. The first four digits of each index code denote the information corresponding to program attribute and the following two digits denote the information indicative of the number of the part image in the part image data group.

Therefore, index code "010201" is assigned to the part image data for creating a succor ball for altering the basic character image to a succor fan character and index code "010202" is assigned to the part image data for creating a succor uniform.

The above-mentioned arrangement allows, if the viewing time of a baseball live program has increased over a predetermined period of time, to alter an already created character image to a baseball fun character by reading the part image data having 4-digit information corresponding to the program attribute of that baseball live program and combining the part image created by these part image data with the already created character image, which will also be described later.

In addition to the basic character image data, the part image data corresponding to the summary result of the viewing log summary table shown in FIG. 6 are supplied to the character creator 16 to create a character image obtained by combining the basic character image with the part image and the resultant character image is supplied to the video combiner 15.

Consequently, the video signal of the broadcast program from the selector 14 is combined with the character image from the character creator 16 in the video combiner 15 and the combined video signal is supplied to the display 18 through the video signal processor 17, thereby displaying the video of the broadcast program and the character image uniquely created in the television receiving set 1 in accordance with the user's liking in viewing for broadcast programs.

It should be noted that, as described above, the index code of the image data in use is stored and held as used image data information in an area separate from the storage area of the image data in the character data memory 36 or in another non-volatile memory, thereby preventing the same part image from use in a duplicate manner.

[Creating and Displaying of Character Images]

Figure 8:
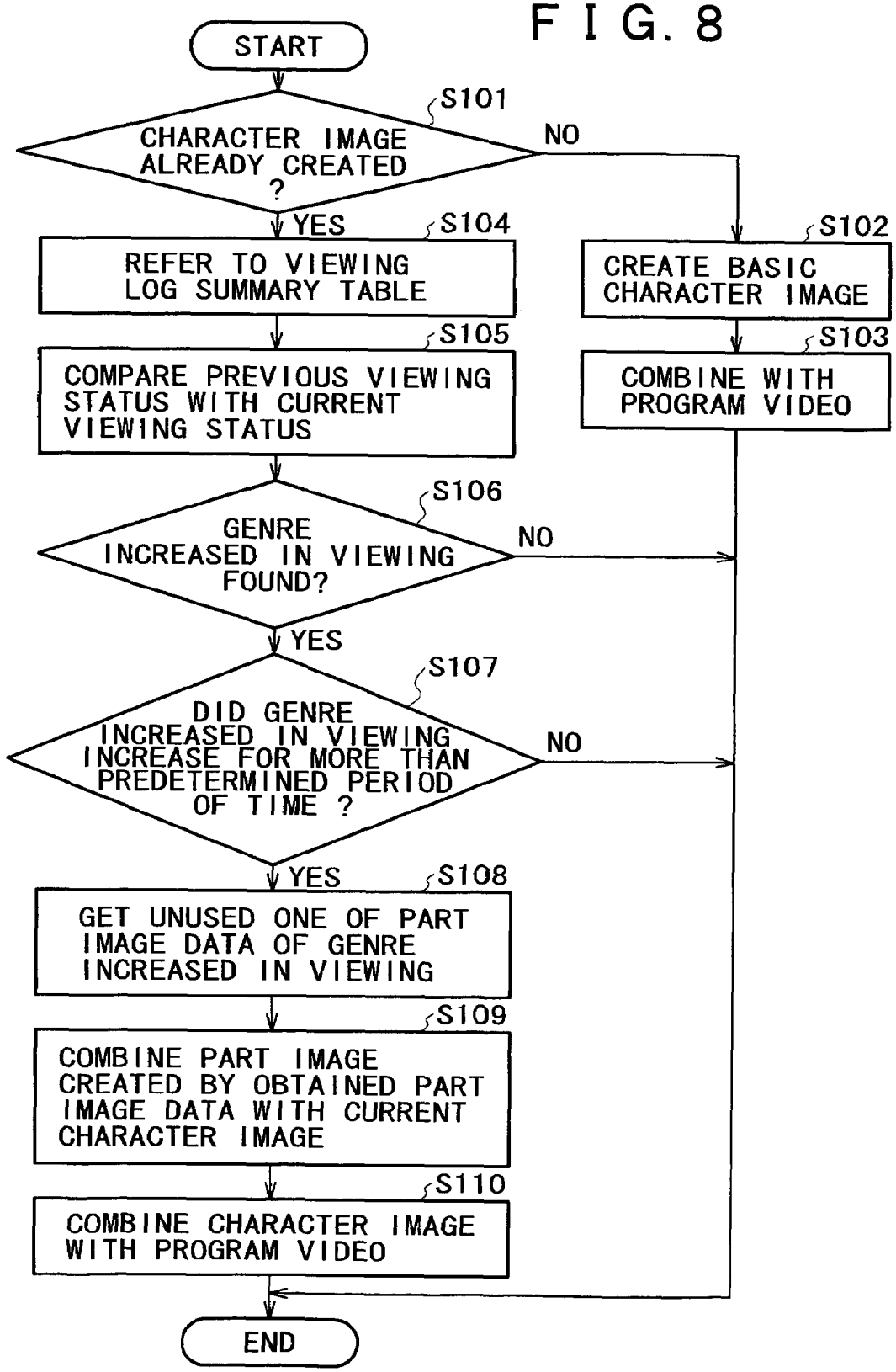
FIG. 8 is a flowchart describing the processing of character image forming and displaying which is executed in the television receiving set 1 shown in FIG. 3.

The following describes the processing of creating and displaying character images in the television receiving set 1 of the present embodiment configured as described above with reference to the flowchart shown in FIG. 8.

The processing shown in the flowchart of FIG. 8 is executed in the controller 30 of the television receiving set 1 immediately after the television receiving set 1 is powered on and at predetermined time intervals (for example, every 30 minutes, every hour, or every two hours) thereafter for example.

The controller 30 of the television receiving set 1 executes the processing shown in FIG. 8 in the above-mentioned timed relation; first, the controller 30 references the used image data information stored in a predetermined storage area such as the character dada memory 36 to determine whether a character image has already been created (step S101).

If, in the decision process of step S101, no character image is found created, then the controller 30 reads the basic character image data from the character data memory 36 and supplies these data to the character creator 16 to create the basic character image (step S102).

The process of step S102 includes a process of recording the index code assigned to the basic character image data to a predetermined storage area such as the character data memory 36 as used image data information. After the process of step S102, the basic character image formed in the character creator 16 is supplied to the video combiner 15 to combine the video signal supplied from the selector 14 with this basic character image (step S103), upon which the processing shown in FIG. 8 comes to an end.

If, in the decision process of step S101, a character image is found already created, then the controller 30 references the viewing log summary table shown in FIG. 6 (step S104) to compare the last viewing log with the current viewing log (step S105).

Next, on the basis of a comparison result obtained in step S105, the controller 30 determines whether there is any program genre (program attribute) that has increased in viewing time (step S106). If a program genre increased in viewing time is found in the decision process of step S106, then the controller 30 determines whether the viewing time of that genre has increased more than a certain period of time (step S107).

The process of step S107 is executed to ignore those broadcast programs which are unintendedly viewed by the use at the time of switching channels for example, thereby ensuring accuracy in character change by preventing user's liking in viewing from being obtained from those unintendedly viewed broadcast programs.

If, in the decision process of step S107, the viewing time of the program genre increased in viewing time is found increasing more than a predetermined period of time, then the part image data corresponding to the program genre increased in viewing time more than a predetermined period of time, these part image data having not yet used, are obtained from the character table configured as described with reference to FIG. 7 (step S108).

In the process of step S108, whether the part image data have not yet been used may be determined from the used image data information stored and held in the character data memory 36 for example.

In step S108, the newly obtained part image data are also supplied to the character creator 16 which is controlled so that the character image adapted to be currently displayed is combined with the part image created from the newly obtained part image data, thereby altering the current character image to the desired one (step S109).

The character image altered in the character creator 16 in the process of step S109 is supplied to the video combiner 15 to be combined with the video of the broadcast program (step S110), upon which the processing shown in FIG. 8 comes to an end.

If there is found no program genre increased in viewing time in the decision process of step S106 and, if the viewing time of the program genre increased in viewing time is found not increasing more than a predetermined period of time in the decision process of step S107, it indicates that there is no need for altering the character image, so that the processing shown in FIG. 8 comes to an end without altering the current character image.

Thus, the television receiving set 1 is adapted to uniquely create and display character images on its own and alter created character images in accordance with the liking in viewing of the user of television receiving set 1 for broadcast programs. Namely, the television receiving set 1 can display not only the video corresponding to externally supplied information but also character images uniquely created by the television receiving set 1 on its own.

SPECIFIC EXAMPLE OF ALTERING OF CHARACTER IMAGES

The following describes, with reference to FIGS. 9A, 9B and 9C, specific examples of the processing for creating and displaying character images in the television receiving set 1 described with reference to FIG. 8. The following description uses an example in which a viewing log summary table is created as shown in FIG. 6 and a character table as shown in FIG. 7 is held in the character data memory 36.

In the following description, it is assumed that the use of the television receiving set 1 started on September 1 (9/1) and the viewing time to be summarized for each program attribute (program genre) is counted when it is more than two hours in order to reflect user's liking in viewing for broadcast programs.

Figure 9A:
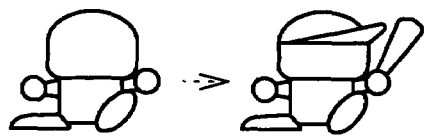
FIGS. 9A, 9B and 9C illustrate specific examples of the processing of character image forming and displaying which is executed in the television receiving set 1 shown in FIG. 3.
Figure 9B:

In the television receiving set 1 of which use started, the basic character image is shown as shown in character image (A) in FIG. 9A on September 1 which is the day on which the use started. Then, because a baseball live coverage program was viewed for two and a half hours for example as shown in FIG. 6, part image data are used to create a baseball cap part image to alter the basic character image to a baseball fan character, thereby creating and displaying a character image with a baseball cap combined.

Next day, September 2, a baseball live coverage program was viewed for two hours and a cooking program was viewed for two hours as shown in FIG. 6, so that the viewing periods of time of these program both exceed a predetermined period of time (two hours in this example). Consequently, as shown in FIG. 9B, character image (B) adapted to be displayed up to September 1 is added with a baseball bat part image on September 2 as shown in character image (C) and then is added with a cook's hat as shown in character image (D) and the resultant image is displayed.

Figure 9C:
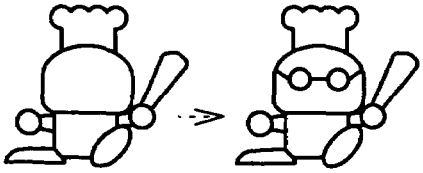

Then, the next day, September 3, a quiz program was viewed for two hours and a news program for 30 minutes as shown in FIG. 6; of these programs, the viewing time of the quiz program exceeded a predetermined period of time (two hours in this example), so that character image (D) adapted to be displayed until September 2 is altered to character image (E) with glasses added which is shown on September 3 as shown in FIG. 9C.

Thus, in the television receiving set 1 of the present embodiment, character images uniquely created and displayed by the television receiving set 1 are adapted to be automatically altered in accordance with the liking in viewing of the user of the television receiving set 1.

Consequently, the above-mentioned novel configuration makes the user of the television receiving set 1 become more friendly with the television receiving set 1 and provides images which the user enjoys besides broadcast programs, thereby realizing a television receiving set which is high in user friendliness and entertainment. In addition, the above-mentioned novel configuration character images allow the user of the television receiving set 1 to understand what genres of programs he views often and his own liking in viewing, thereby enhancing the convenience in viewing broadcast programs.

OTHER EXAMPLES

In the above-mentioned embodiment, an example in which character images are altered is used. However, the present invention is not restricted to the above-mentioned example. For example, in accordance with the user of the television receiving set 1, the colors of character images may be changed or both the forms of and colors of character images may be changed to attain the above-mentioned effects.

In the above-mentioned embodiment, viewing log data of each viewed broadcast programs are accumulated and the accumulated viewing log data are summarized for each of program attributes to form a viewing log summary table as shown in FIG. 6. However, the present invention is not restricted to the above-mentioned example. For example, viewing log data may be summarized into a viewing log summary table shown in FIG. 6 from the beginning without accumulating the viewing log data for each of viewed broadcast programs.

The image data for creating character images are not restricted to those shown in FIG. 7; various other image data may be prepared. In addition, same part image data may be shared between a plurality of genres, quiz programs and education programs, for example.

In the above-mentioned embodiment, the image forming apparatus and the image forming method are applied to the television receiving set 1. It will be apparent that the present invention may also be applied to various other receiving apparatuses for receiving analog ground-wave television broadcast, digital satellite broadcast, and cable television broadcast.

In the above-mentioned embodiment, the image data for creating character images are stored in advance in the character data memory 36; however, the present invention is not restricted to this configuration. For example, the image data for creating character images may be downloaded from a server on the Internet in an appropriate timed relation to make the downloaded data ready for creating new character images. This setup prevents character images from getting boring and banal for users.

As described above, the television receiving set 1 incorporates the modem 40 for connecting it to the Internet to download necessary information such as program guide data and image data from the server 3; however, the present invention is not restricted to this configuration.

For example, the necessary data may also be distributed by use of various broadcasting waves as shown in FIG. 10. If analog ground-wave television broadcasting is used for example, the program guide data and the image data for forming character images may be superimposed on a free area in the vertical blanking interval (VBL) of each television broadcast signal, the resultant television broadcast signal being broadcast. The television receiver side extracts the necessary data such as the program guide data from the received television broadcast signal and supplies the extracted data to the controller 30 to store the data into a predetermined memory.

In the case of digital ground-wave broadcasting or digital video broadcasting, the program guide data and the image data for forming character images may be packetized to be multiplexed with the video data and audio data of each broadcast program for broadcasting. The program guide data and the image data for forming character images are extracted by the demultiplexer 24 shown in FIG. 3 and the extracted data are supplied to the controller 30 to be stored in a predetermined memory.

As described above, the program guide data, the image data for forming character images, program attribute data, and other various data may be obtained via communication networks such as the Internet or obtained from the distribution through broadcast media. Also, these data may be obtained from both the communication network and the broadcast media.

Obviously, if the character data memory 36 is configured as a detachable external semiconductor memory (a removable memory) and new character images are used, a new character data memory in which image data for forming new character images are stored may be obtained by purchasing for example to replace the old character data memory.

The configuration of the image data (character data) for forming character images is not restricted to that mentioned above. For example, it is also practicable to manage the image data for forming the basic character images and each piece of part data as separate files and use various types of index codes for distinguishing desired image data to extract them.

The timings in which program guide data are obtained, character images are formed and displayed, and character images are altered are not restricted to those used in the above-mentioned embodiment. For example, these timings may be set by the user or otherwise.

The modes of displaying character images are not restricted to those shown in FIGS. 2A and 2B. For example, character images may be displayed as superimposed on the video of each broadcast program or otherwise.

In the above-mentioned embodiment, the television receiving set 1 incorporates the modem 40. Another configuration is also practicable. For example, the modem 40 may be externally connected. Namely, the television receiving set 1 may only have a connection terminal for providing connection with communication equipment such as a modem.

In terms of communication, rather than simply using a modem, it is also practicable to connect the television receiving set 1 to a desired communication network such as the Internet through various equipment (modules) for implementing such communication capabilities arranged inside or outside television receiving sets or receivers as communication connection equipment for providing connection with an ADSL (Asymmetric Digital Subscriber Line) modem or an optical fiber network and equipment for providing connection with the Internet via a cable television network, thereby obtaining various data such as program guide data.

Further, it is also practicable to automatically distribute, in a predetermined timed relation, various data such as program guide data to the receiving equipment such as registered user's television receiving set or receiver via various communication networks.

As described above and according to the invention, character images can be formed and displayed in accordance with user's liking in viewing for broadcast programs. Because character images can be altered in accordance with user's liking in viewing for broadcast programs, user-friendliness and entertainment are enhanced and, because user's liking in viewing for broadcast programs can be notified, the convenience in viewing broadcast programs is enhanced.

The invention claimed is:

1. An image forming apparatus comprising:
    obtaining means for obtaining program guide data including at least attribute information of each broadcast program;
    use log forming means for forming, by identifying each broadcast program adapted to be viewed, use log information for said identified each broadcast program;
    character image forming means for forming a character image to be displayed by use of image data for forming a character image;
    viewing log summary table forming means for forming a viewing log summary table obtained by relating said use log information formed at least by said use log forming means to said attribute information included in said program guide data obtained by said obtaining means; and
    character image altering means for altering said character image formed in advance, on the basis of said viewing log summary table.

2. The image forming apparatus according to claim 1, wherein said obtaining means connects a communication line with a server arranged on a communication network and obtains said program guide data from said server.

3. The image forming apparatus according to claim 1, wherein said obtaining means obtains said program guide data which are multiplexed with a received broadcast signal.

4. The image forming apparatus according to claim 1, wherein said viewing log summary table is updated in a predetermined time interval and
    said character image altering means alters said character image formed in advance, in accordance with the update of said viewing log summary table.

5. The image forming apparatus according to claim 1, further comprising:
    image data obtaining means for obtaining image data from a server holding image data for forming various character images arranged on a communication network by connecting a communication line with said server.

6. The image forming apparatus according to claim 1, wherein said broadcast signal is multiplexed with image data for forming a character image as required;
    said image forming apparatus further comprising:
    image data extracting means for extracting said image data from said broadcast signal to make the extracted image data usable.

7. An image forming method comprising the steps of:
    obtaining program guide data including at least attribute information of each broadcast program;
    forming, by identifying each broadcast program adapted to be viewed, use log information for said identified each broadcast program;
    forming a character image to be displayed by use of image data for forming a character image;

forming a viewing log summary table obtained by relating said use log information formed at least in said use log forming step to said attribute information included in said program guide data obtained in said obtaining step; and altering said character image formed in advance, on the basis of said viewing log summary table.

8. The image forming method according to claim 7, wherein, in said obtaining step, a communication line is connected with a server arranged on a communication network and said program guide data are obtained from said server.

9. The image forming method according to claim 7, wherein, in said obtaining step, said program guide data are obtained by extracting said program guide data which are multiplexed with a received broadcast signal.

10. The image forming method according to claim 7, wherein said viewing log summary table is updated in a predetermined time interval and, in said character image altering step, said character image formed in advance is altered in accordance with the update of said viewing log summary table.

11. The image forming method according to claim 7, further comprising the step of:

obtaining image data from a server holding image data for forming various character images arranged on a communication network by connecting a communication line with said server.

12. The image forming method according to claim 7, wherein said broadcast signal is multiplexed with image data for forming a character image as required;

said image forming method further comprising the step of:

extracting said image data from said broadcast signal to make the extracted image data usable.

* * * * *